(12) United States Patent
Li et al.

(10) Patent No.: US 12,241,977 B1
(45) Date of Patent: Mar. 4, 2025

(54) PASSIVE HUMAN DETECTION METHOD AND APPARATUS, DEVICE, AND MEDIUM

(71) Applicant: Beijing Xsmart Century Technology Co., Ltd., Beijing (CN)

(72) Inventors: Yueting Li, Beijing (CN); Dian Fan, Beijing (CN); Fan Zeng, Beijing (CN); Zhenyu Yang, Beijing (CN); Yi Li, Beijing (CN); Yangbo Lin, Beijing (CN)

(73) Assignee: Beijing Xsmart Century Technology Co., Ltd., Beijing (CN)

( * ) Notice: Subject to any disclaimer, the term of this patent is extended or adjusted under 35 U.S.C. 154(b) by 0 days.

(21) Appl. No.: 18/833,386

(22) PCT Filed: May 22, 2024

(86) PCT No.: PCT/CN2024/094611
§ 371 (c)(1),
(2) Date: Jul. 25, 2024

(87) PCT Pub. No.: WO2024/199547
PCT Pub. Date: Oct. 3, 2024

(30) Foreign Application Priority Data

Mar. 28, 2023 (CN) .......................... 202310313072.0

(51) Int. Cl.
*G01S 17/04* (2020.01)
*G01J 5/48* (2022.01)
(Continued)

(52) U.S. Cl.
CPC .............. *G01S 17/04* (2020.01); *G01J 5/485* (2022.01); *G01S 7/4802* (2013.01);
(Continued)

(58) Field of Classification Search
CPC ...... G01S 17/04; G01S 7/4802; G01S 7/4808; G01S 17/87; G01J 5/485; G06V 40/23
See application file for complete search history.

(56) References Cited

U.S. PATENT DOCUMENTS

2018/0087968 A1   3/2018   Isozaki
2019/0333233 A1*   10/2019   Hu ........................... G01S 13/04
(Continued)

FOREIGN PATENT DOCUMENTS

CN    109118636 A    1/2019
CN    110232301 A    9/2019
(Continued)

OTHER PUBLICATIONS

Teixeira T, Dublon G, Savvides A. A survey of human-sensing: Methods for detecting presence, count, location, track, and identity. ACM Computing Surveys. Sep. 1, 2010;5(1):59-69. (Year: 2010).*

*Primary Examiner* — Fayyaz Alam
(74) *Attorney, Agent, or Firm* — Bayramoglu Law Offices LLC

(57) ABSTRACT

A passive human detection method and apparatus, a device, and a medium are provided. The passive human detection method includes: acquiring an infrared radiation signal in an environment, and acquiring a temperature of a target object; emitting an electromagnetic wave into the environment, and acquiring a reflected echo signal; determining a position of the target object in the environment based on the echo signal; matching a threshold range based on the position of the target object; and comparing the temperature of the target object with the threshold range to determine detection information of a human in the environment. The passive human detection method combines electromagnetic wave detection and thermal imaging to detect whether there is a human in the current environment. The passive human (Continued)

detection method can effectively filter out interference signals, greatly improving the accuracy and sensitivity of human detection.

16 Claims, 2 Drawing Sheets

(51) Int. Cl.
    *G01S 7/48*     (2006.01)
    *G01S 17/87*     (2020.01)
    *G06V 40/20*     (2022.01)

(52) U.S. Cl.
    CPC ............ *G01S 7/4808* (2013.01); *G01S 17/87* (2013.01); *G06V 40/23* (2022.01)

(56) References Cited

U.S. PATENT DOCUMENTS

| | | | | |
|---|---|---|---|---|
| 2022/0057519 A1* | 2/2022 | Goldstein | ............... | G01S 17/88 |
| 2024/0424678 A1* | 12/2024 | Vu | ........................... | G01S 17/87 |

FOREIGN PATENT DOCUMENTS

| | | | | | |
|---|---|---|---|---|---|
| CN | 110687513 | A | | 1/2020 | |
| CN | 111964789 | A | | 11/2020 | |
| CN | 111982304 | A | | 11/2020 | |
| CN | 112731366 | A | * | 4/2021 | ............ G01S 13/06 |
| CN | 112815498 | A | | 5/2021 | |
| CN | 113537035 | A | | 10/2021 | |
| CN | 113866761 | A | | 12/2021 | |
| CN | 115167455 | A | * | 10/2022 | |
| CN | 116009107 | A | | 4/2023 | |
| CN | 220019916 | U | | 11/2023 | |
| JP | 2007233907 | A | | 9/2007 | |
| JP | 2009156776 | A | | 7/2009 | |
| JP | 2014115262 | A | | 6/2014 | |
| TH | 95141 | A | | 4/2009 | |
| WO | 2018120240 | A1 | | 7/2018 | |
| WO | 2018201458 | A1 | | 11/2018 | |

\* cited by examiner

PASSIVE HUMAN DETECTION METHOD AND APPARATUS, DEVICE, AND MEDIUM

CROSS REFERENCE TO THE RELATED APPLICATIONS

This application is the national phase entry of International Application No. PCT/CN2024/094611, filed on May 22, 2024, which is based upon and claims priority to Chinese Patent Application No. 202310313072.0, filed on Mar. 28, 2023, the entire contents of which are incorporated herein by reference.

TECHNICAL FIELD

The present disclosure relates to the technical field of human detection, and in particular to a passive human detection method and apparatus, a device, and a medium.

BACKGROUND

At present, human detection is mainly performed using passive infrared (PIR) sensors, millimeter-wave (mmWave) radar sensors, and red, green, and blue (RGB) cameras, etc.

PIR sensors are susceptible to interference from various heat and light sources, and are greatly affected by environmental temperature. In addition, PIR radiation has poor penetration, and is not easily detected by the probe, making PIR sensors unable to detect stationary humans or recognize human motion states.

mmWave radar sensors have high resolution, high anti-interference ability, and high accuracy in detecting moving or slightly moving targets. However, mmWave radar sensors are prone to misidentifying other moving objects as humans during human detection. In addition, mmWave radar sensors require high-precision radar to recognize human motion states.

RGB cameras are a type of machine learning (ML)-based human detection technique, which is prone to privacy infringement and limited in applicable scenarios.

Overall, it is necessary to address the problems of existing human detection techniques that are susceptible to interference and have low detection accuracy.

SUMMARY

Given the above analysis, an embodiment of the present disclosure provides a passive human detection method to address the problems of existing human detection techniques that are susceptible to interference and have low detection accuracy. The embodiment of the present disclosure provides the following technical solution. The passive human detection method includes:
  acquiring an infrared radiation signal in an environment, and acquiring a temperature of a target object;
  emitting an electromagnetic wave into the environment, and acquiring a reflected echo signal;
  determining a position of the target object in the environment based on the echo signal;
  matching a threshold range based on the position of the target object; and
  comparing the temperature of the target object with the threshold range to determine detection information of a human in the environment.

In some embodiments, the infrared radiation signal is acquired by a thermal imager, and is converted into a thermal image.

In some embodiments, the passive human detection method further includes: determining a distance between the target object and an infrared radiation signal detection source based on the echo signal, and determining the threshold range through a temperature display range model based on the distance.

In some embodiments, the threshold range matches a temperature display range of the human presented in the thermal image at the distance.

In some embodiments, if the temperature of the target object is within the threshold range, a motion posture of the target object is determined through a posture recognition model based on a shape of the target object in the thermal image.

In some embodiments, motion parameter information of the target object with the motion posture is determined based on the echo signal and the thermal image.

In some embodiments, the detection information of the human includes one or a combination of more of whether there is a human, human position, height, human posture, or motion parameter information.

The present disclosure further provides a passive human detection apparatus, including:
  a temperature detection module, configured to acquire an infrared radiation signal in an environment, and acquire a temperature of a target object;
  an electromagnetic wave detection module, configured to emit an electromagnetic wave into the environment, and acquire a reflected echo signal;
  a position detection module, configured to determine a position of the target object in the environment based on the echo signal;
  a threshold matching module, configured to match a threshold range based on the position of the target object; and
  a human detection module, configured to compare the temperature of the target object with the threshold range to determine detection information of a human in the environment.

The present disclosure further provides an electronic device, including a memory and a processor, where the memory is configured to store a computer program; and the computer program is executed by the processor to implement the passive human detection method according to any one of the above embodiments.

The present disclosure further provides a computer-readable storage medium for storing a computer program, where the computer program is executed by a processor to implement the passive human detection method according to any one of the above embodiments.

Beneficial Effects:

The human detection system provided by the present disclosure combines electromagnetic wave detection and thermal imaging to detect whether there is a human in the current environment. The human detection system can effectively filter out interference signals, greatly improving the accuracy and sensitivity of human detection. In addition, the human detection system can also combine the recognition of target spatial position and velocity by an electromagnetic wave detector and the temperature pixel information of thermal imaging to identify the number of people and their motion states.

Furthermore, the embodiments of the present disclosure can also adjust the threshold range for temperature determination of the target object by determining the distance between the target object and the infrared radiation signal emission source. In this way, the present disclosure avoids the interference of temperature display changes caused by the distance between the human and the thermal imager on detection.

BRIEF DESCRIPTION OF THE DRAWINGS

To describe the technical solutions in embodiments of the present disclosure or in the prior art more clearly, the following briefly describes the drawings required for describing the embodiments of the present disclosure or in the prior art. Apparently, the drawings in the following description show merely some embodiments of the present disclosure, and those of ordinary skill in the art may still derive other drawings from these drawings.

Figure 1:
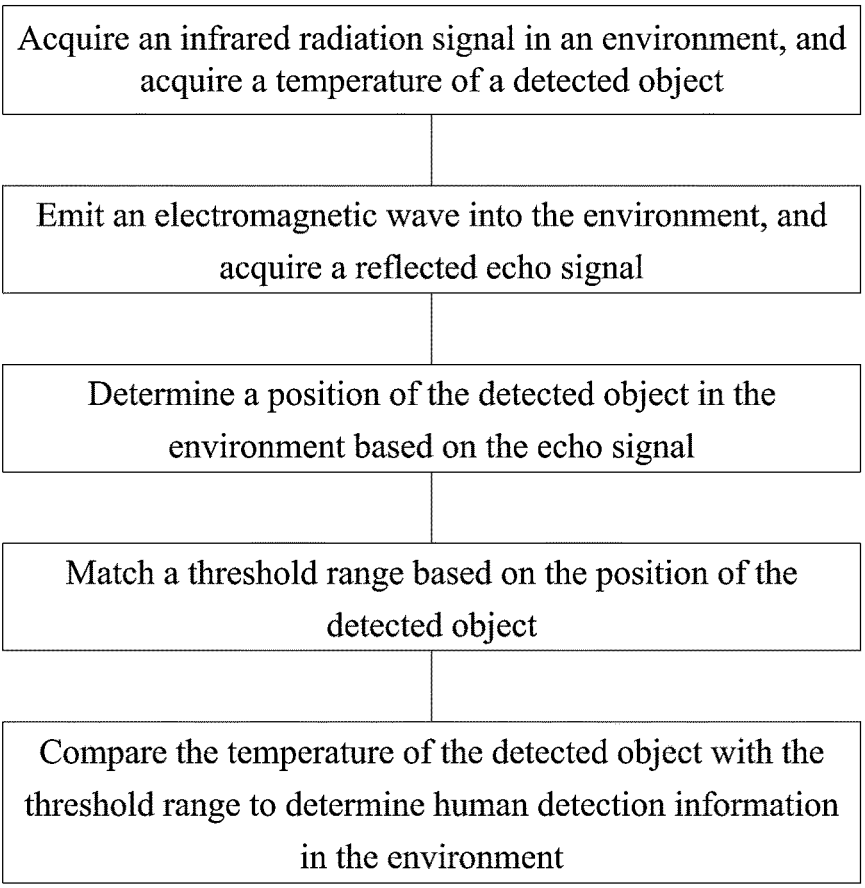
FIG. 1 is a flowchart of a passive human detection method according to the present disclosure.

Reference Numerals: 1. thermal imager; 2. electromagnetic wave detector; 3. position recognition module; 4. processing module; 41. threshold determination unit; 5. distance detection module; 6. orientation detection module; and 7. motion state module.

DETAILED DESCRIPTION OF THE EMBODIMENTS

In order to make the objectives, technical solutions, and advantages of the embodiments of the present disclosure clearer, the technical solutions in the embodiments of the present disclosure will be clearly and completely described below in conjunction with the drawings in the embodiments of the present disclosure. Apparently, the described embodiments are some, rather than all of the embodiments of the present disclosure. It should be noted that, the embodiments in the present disclosure or the features in the embodiments may be combined, separated, exchanged, and/or rearranged with each other in a non-conflicting manner. All other embodiments obtained by those skilled in the art based on the embodiments of the present disclosure without creative efforts shall fall within the protection scope of the present disclosure.

In the drawings, for clarity and/or descriptive purposes, the size and relative size of the component can be enlarged. When the exemplary embodiment can be implemented differently, a specific process sequence can be executed in an order different from the described order. For example, two consecutively described processes may be executed simultaneously or in a reverse order of the described order. In addition, the same reference numerals in the drawings represent the same parts.

When a component is described as being "on" or "above" another component, "being connected to", or "being combined to" another component, the component may be directly on another component, directly connected to or combined to the another component, or connected to the another component through an intermediate component. However, when a component is described as "being directly on", "being directly connected to", or "being directly combined to" another component, there is no intermediate component. For this purpose, the term "connection" may refer to a physical connection, an electrical connection, or the like, with or without an intermediate component.

For descriptive purposes, the present disclosure use spatially relative terms, such as "top", "bottom", "under", "beneath", "below", "lower", "above", "upper", "upper", "over", and "higher" to describe a relationship (relationships) between one component and another component (other components) shown in the drawings.

The terms used herein are merely intended to describe specific embodiments, rather than to limit the present disclosure. As used herein, the singular forms "a", "an" and "the" are intended to include the plural forms, unless the context clearly indicates otherwise. In addition, the terms "comprising", "including", and/or "containing" and variants thereof, when used in this specification, specify the presence of stated features, entireties, steps, operations, components, elements, and/or combinations thereof, but do not preclude the presence or addition of one or more other entireties, steps, operations, components, elements and/or combinations thereof. It should also be noted that the terms "basically", "approximately", and other similar terms used herein are used as approximate terms rather than degree terms, so that they are used to explain inherent deviations of measured values, calculated values, and/or provided values that are recognized by those of ordinary skill in the art.

A specific embodiment of the present disclosure provides a passive human detection method to address the problems of existing human detection techniques that are susceptible to interference and have low detection accuracy. As shown in FIG. 1, the technical solution provided by this embodiment includes the following steps.

An infrared radiation signal in an environment and a temperature of a target object are acquired.

An electromagnetic wave is emitted into the environment, and a reflected echo signal is acquired.

A position of the target object in the environment is acquired based on the echo signal.

A threshold range is matched based on the position of the target object.

The temperature of the target object is compared with the threshold range to determine detection information of a human in the environment.

Preferably, the infrared radiation signal is acquired by a thermal imager, and is converted into a thermal image. Specifically, thermal imager is configured to acquire the infrared radiation signal in the environment and form the thermal image. By emitting the electromagnetic wave through an electromagnetic wave detector and receiving the echo signal, the spatial information of the object, such as position, distance, shape, height, as well as motion information such as velocity and acceleration, are determined based on the echo signal.

Specifically, in this embodiment, by analyzing the echo signal of the electromagnetic wave emitted by the electromagnetic wave detector, the position of the "obstacle" in the environment, i.e. the target object, is determined, thereby determining the possible human position area in the target environment. Temperature comparison of the position area is performed based on the thermal image formed by the infrared radiation signal. If the comparison result meets an expectation, it is preliminarily believed that there is a human in the position area and further confirmation is needed. Due to the significant impact of the distance between the human and the infrared radiation signal detection source, such as the thermal imager, on the infrared radiation signal, the displayed value of human temperature detected by the thermal imager will decrease with the increase of distance. Meanwhile, the distance and orientation of the human have a significant impact on the temperature distribution of the human in the thermal image. Therefore, in this embodiment, the position of the target object matches the threshold range, and the threshold range matches a temperature range of the human presented in the thermal image at a specific position. The design reduces the adverse effects brought by the characteristics of the thermal imager and improves detection accuracy.

After the threshold range is determined, the temperature in the corresponding area of the target object in the thermal image is compared with the threshold range. In some embodiments, the proportion of a part between the upper and lower limits of the threshold range in the area can be determined, so as to determine whether the target object meets the comparative expectation. If the temperature of most parts of the target object is within the threshold range, it is preliminarily considered that the target object is a human, and further information analysis is conducted on the target object.

In some embodiments, the detection information of the human includes one or a combination of more of whether there is a human, human position, height, human posture, or motion parameter information. The detection information of the human can be understood as a comprehensive collection of information including the presence of the human, human posture, the scene, the motion state, velocity, acceleration, and other related information. The electromagnetic wave detector can measure information such as human position, velocity, acceleration, and height. The thermal image formed by the infrared radiation signal can be used to determine the human posture, such as lying, standing, and sitting.

Preferably, the passive human detection method further includes the following step. A distance between the target object and an infrared radiation signal detection source is determined based on the echo signal, and the threshold range is determined through a temperature display range model based on the distance. The threshold range matches a temperature display range of the human presented in the thermal image at the distance. This embodiment mainly focuses on the influence of the distance of the target object on the temperature presentation in the thermal image.

In some embodiments, the threshold range is adjusted based on the distance. Specifically, based on the distance, the threshold range is determined by the temperature display range determination model. The temperature display range determination model is obtained through training based on the temperatures displayed in the thermal image of a plurality of humans at different distances from the thermal imager. The temperature display range determination model is configured to output the temperature display range of the human at a specific distance based on the input distance.

Preferably, if the temperature of the target object is within the threshold range, a motion posture of the target object is determined through a posture recognition model based on a shape of the target object in the thermal image. The posture recognition model is obtained through training based on the thermal image formed by different human postures.

In some embodiments, motion parameter information of the target object with the motion posture is determined based on the echo signal and the thermal image.

Figure 2:
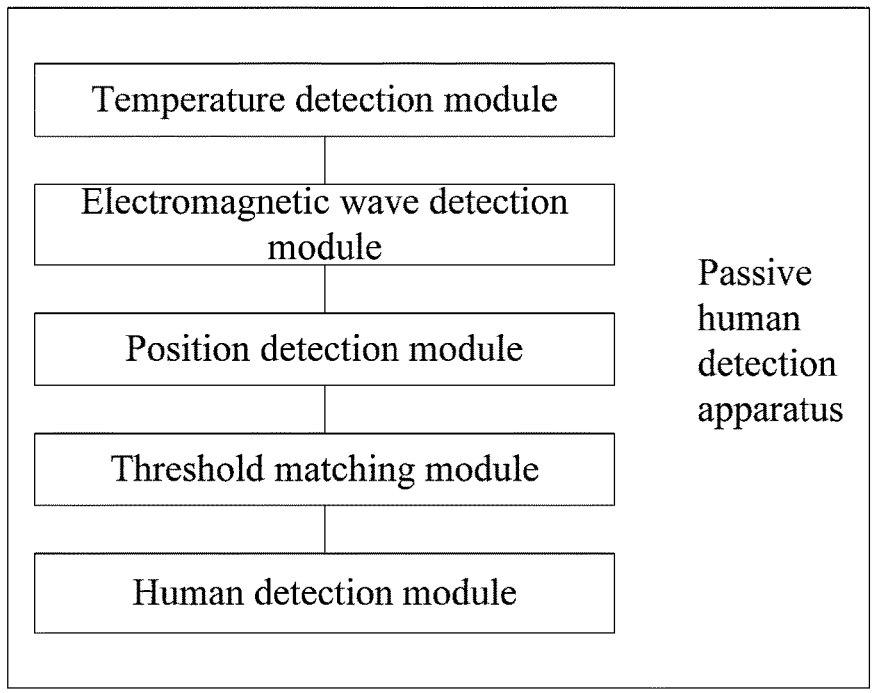
FIG. 2 is a block diagram of a passive human detection apparatus according to the present disclosure.

The present disclosure further provides a passive human detection apparatus. As shown in FIG. 2, components of the passive human detection apparatus are described as follows.

A temperature detection module is configured to acquire an infrared radiation signal in an environment, and acquire a temperature of a target object.

An electromagnetic wave detection module is configured to emit an electromagnetic wave into the environment, and acquire a reflected echo signal.

A position determination module is configured to determine a position of the target object in the environment based on the echo signal.

A human detection module is configured to determine whether the temperature of the target object is within the threshold range based on the position of the target object and the infrared radiation signal, so as to determine detection information of the human in the environment.

Figure 3:
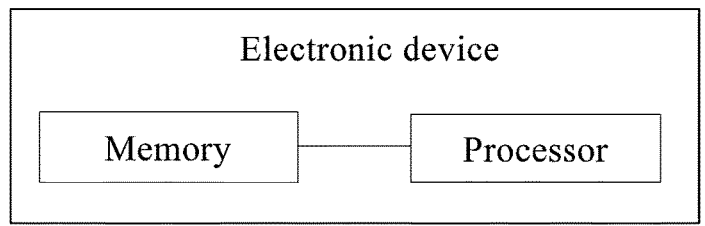
FIG. 3 is a block diagram of an electronic device according to the present disclosure.

The present disclosure further provides an electronic device. As shown in FIG. 3, the electronic device includes a memory and a processor, where the memory is configured to store a computer program; and the computer program is executed by the processor to implement the passive human detection method according to any one of the above embodiments.

The present disclosure further provides a computer-readable storage medium for storing a computer program, where the computer program is executed by a processor to implement the passive human detection method according to any one of the above embodiments.

Figure 4:
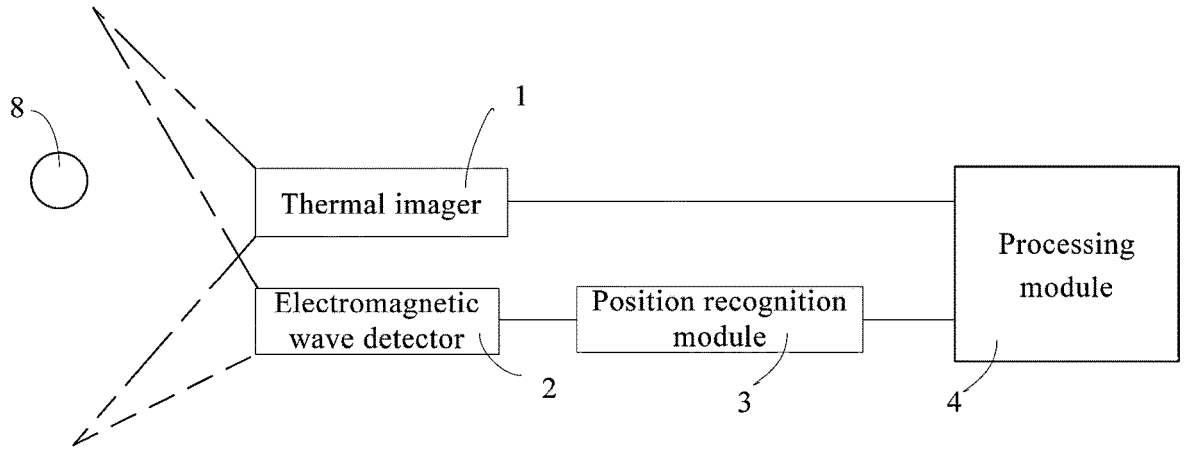
FIG. 4 is a block diagram of a human detection system according to an embodiment of the present disclosure.

As shown in FIG. 4, a specific embodiment of the present disclosure further provides a human detection system. The human detection system includes the following components. Thermal imager 1 is configured to acquire a thermal image of an environment. Electromagnetic wave detector 2 is configured to emit an electromagnetic wave to the environment and acquire a reflected echo signal. The position recognition module 3 is connected to the electromagnetic wave detector 2 in communication, and is configured to determine a position of the target object 8 based on the echo signal. The human detection system further includes processing module 4, which is connected to the thermal imager 1 and the position recognition module 3 in communication, respectively. The processing unit 4 is configured to: determine whether a temperature at the position is within a threshold range based on the thermal image, and if yes, preliminarily determine that a human may be detected. More precise technical means can be used for further confirmation in the future, which will not be further elaborated herein. The threshold range can be set based on the empirical data of temperature presented by the human in the thermal image, and it has upper and lower limits. If the temperature presented in the thermal image is between the upper and lower limits, it is considered to be within the threshold range.

The position recognized by the position recognition module 3 refers to the position of the target object 8 within an electromagnetic wave detection area. For example, when the electromagnetic wave detection result is displayed in a plane graph, this position refers to the position of the target object 8 displayed on the plane graph, which can correspond to the position in the thermal image. Alternatively, for example, if the electromagnetic wave detection result is displayed in a sector area, this position refers to one of the target object 8 at a certain angle or direction.

Specifically, the electromagnetic wave detector 2 is configured to emit the electromagnetic wave to the environment or target area and receive the reflected echo signal. The position recognition module 3 can be an internal analysis module of the electromagnetic wave detector 2, and it can be understood as a signal analysis module outside of the electromagnetic wave generator and receiver of the electromagnetic wave detector 2. By analyzing the echo signal, it can be determined whether there is the target object 8 in the detected environment or target area. The target object 8 refers to an object such as a human, a small animal, and a small building that can form an electromagnetic wave obstacle. The position recognition module 3 can acquire spatial information on the position of each target object 8 through echo signal analysis. Therefore, if only the electromagnetic wave detector 2 is used for human detection, it is easy to mistakenly recognize one target object 8 as a human.

On this basis, this embodiment further performs human detection based on the thermal image or a temperature matrix acquired by the thermal imager 1. If the thermal imager 1 is used alone for detection, it is susceptible to interference from other heat and light sources, and is greatly affected by environmental temperature.

In this embodiment, the electromagnetic wave detector 2 is configured to perform electromagnetic wave detection. The position recognition module determines whether there are target objects 8 that are suspected to be humans in the target area, thereby determining a plurality of target objects. Then the temperature at the position of the target object 8 is determined based on the thermal image or temperature matrix acquired by the thermal imager 1. According to the temperature display of the human in the thermal image, a threshold is set. If the temperature at the position of the target object 8 in the thermal image is within the threshold range, it is preliminarily detected that there may be a human at that position. The position recognition module can determine the number of humans in the target area and determine their respective positions. The design effectively filters out interference signals, significantly improving the accuracy and sensitivity of human detection. The design effectively filters out interference signals, significantly improving the accuracy and sensitivity of human detection.

Figure 5:
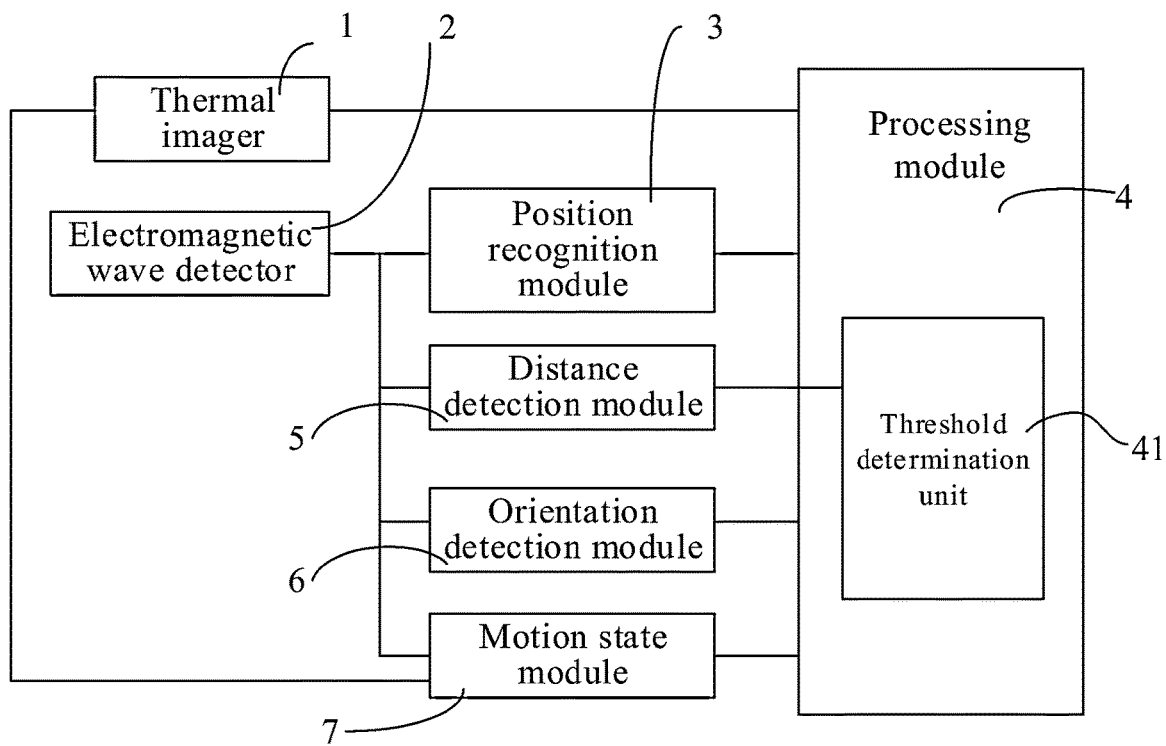
FIG. 5 is a block diagram of a human detection system according to a preferred embodiment of the present disclosure.

Preferably, as shown in FIG. 5, in some embodiments, the human detection system further includes distance detection module 5, which is connected to the electromagnetic wave detector 2 in communication. The distance detection module 5 is configured to determine the distance of the target object 8 based on the echo signal. The human detection system further includes orientation detection module 6, which is connected to the electromagnetic wave detector 2 in communication. The orientation detection module 6 is configured to determine the orientation of the target object 8 based on the echo signal. Due to the significant impact of the distance on the infrared radiation signal, the displayed value of human temperature detected by the thermal imager 1 will decrease with the increase of distance. Meanwhile, the distance and orientation of the human have a significant impact on the temperature distribution of the human in the thermal image. Therefore, the distance detection module 5 and the orientation detection module 6 are designed to determine the distance and orientation of the target object 8. The processing module 4 further includes threshold determination unit 41. The threshold determination unit 41 is configured to adjust the temperature values of the upper and lower limits by changing the threshold range based on the distance of the target object 8. The design can avoid the interference of temperature display changes caused by the distance between the human and the thermal imager 1 on detection.

The threshold determination unit 41 improves the accuracy of human detection. If a fixed threshold is used, when the human is located at different distances from the thermal imager 1, due to the influence of distance on temperature measurement values, if the lower limit of the threshold is too low, it is easy to recognize a non-human object as a human. If the lower limit of the threshold is too high, it is easy to recognize a distant human as a non-human object. This will result in inaccurate detection. In addition, adjusting the distance of the target object 8 based on the threshold can avoid confusion between humans and other living organisms. For example, the body temperature of a small animal is lower than that of a human at the same distance, and its temperature display cannot fall within the threshold range of that distance, so it will not be recognized as a human.

Preferably, the thermal imager 1 includes an infrared thermal imaging sensor. The electromagnetic wave detector 2 includes a millimeter-wave (mmWave) radar sensor. The frequency of the mmWave radar sensor is 5.8 GHz, 24 GHz, 60 GHz, or is in an ultra-wide band (UWB).

Preferably, there is an overlap in the detection ranges between the thermal imager 1 and the electromagnetic wave detector 2. Ideally, their monitoring range should be consistent. For example, the angles of the lens and electromagnetic wave generator should be consistent and have a common starting point, in order to facilitate information fusion or comparison between the electromagnetic wave detection result and the thermal image.

In some embodiments, as shown in FIG. 5, the human detection system further includes motion state module 7, which is connected to the electromagnetic wave detector 2 in communication. The motion state module 7 is configured to determine a velocity of the target object 8 based on the echo information. Preferably, the motion state module 7 is further connected to the thermal imager 1 in communication. In this embodiment, the motion state module 7 is configured to directly determine the motion parameter of a certain target based on the echo information or acquire the motion parameter of the target through dynamic analysis of the thermal image. However, when the thermal image or electromagnetic wave is used alone, the motion analysis of multiple targets will be affected by interference caused by target occlusion. In this embodiment, the motion state module 7 is further configured to determine the velocity of the target object 8 based on changes in the echo information and the thermal image or analyze the motion states of multiple targets based on the thermal image and echo information.

In addition, in some embodiments, the human detection system provided by the present disclosure further includes an RGB camera or an IPR sensor. By acquiring different types of detection data through multiple sensors, the trained model determines the human state based on the detection data, in order to recognize human motion states such as stillness, walking, falling, sitting and lying, as well as scene states such as sleeping, watching movies, and looking at mobile phones.

Those skilled in the art should further realize that, the units and algorithmic steps of examples described in the embodiments of the present disclosure can be implemented with electronic hardware, computer software, or a combination thereof. In order to clearly describe the interchangeability between the hardware and the software, compositions and steps of each example are generally described above according to functions. Whether the functions are performed by hardware or software depends on particular applications and design constraints of the technical solutions. A person skilled in the art may use different methods to implement the described functions for each specific application, but such implementation should not be considered to be beyond the scope of the present disclosure.

The steps of the method or algorithm described in the embodiments of the present disclosure may be implemented with hardware, a software module executed by a processor, or a combination thereof. The software module can be stored in a random access memory (RAM), an internal memory, a read-only memory (ROM), an electrically programmable ROM, an electrically erasable programmable ROM, a register, a hard disk, a removable disk, a compact disc read-only memory (CD-ROM), or in any other form of common storage medium in the technical art. The calculation, transmission, and control methods involved in the present disclosure are all prior art, and the implementation of the present disclosure does not rely on the computer program itself.

The objectives, the technical solutions and the beneficial effects of the present disclosure are further described in detail by means of the above specific implementation, and it should be understood that what is described above is only the specific implementation of the present disclosure and is not intended to define the scope of protection of the present disclosure. Any modifications, equivalent substitutions, improvements, etc. within the spirit and principles of the present disclosure are intended to be encompassed within the scope of protection of the present disclosure.

What is claimed is:

1. A passive human detection method, comprising:
   acquiring an infrared radiation signal in an environment, and acquiring a temperature of a target object;
   emitting an electromagnetic wave into the environment, and acquiring a reflected echo signal;
   determining a position of the target object in the environment based on the reflected echo signal;
   matching a threshold range based on the position of the target object;
   comparing the temperature of the target object with the threshold range to determine detection information of a human in the environment; and
   determining a distance between the target object and an infrared radiation signal detection source based on the reflected echo signal, and determining the threshold range through a temperature display range model based on the distance; and adjusting temperature values of upper and lower limits by changing the threshold range based on the distance of the target object, wherein the threshold range matches a temperature display range of the human presented in a thermal image at the distance;
   wherein a temperature display range determination model is obtained through training based on temperatures displayed in the thermal image of a plurality of humans at different distances from a thermal imager, and the temperature display range determination model is configured to output the temperature display range of the human at a specific distance based on an input distance.

2. The passive human detection method according to claim 1, wherein the infrared radiation signal is acquired by the thermal imager, and is converted into the thermal image.

3. The passive human detection method according to claim 1, wherein when the temperature of the target object is within the threshold range, a motion posture of the target object is determined through a posture recognition model based on a shape of the target object in the thermal image.

4. The passive human detection method according to claim 3, wherein motion parameter information of the target object with the motion posture is determined based on the reflected echo signal and the thermal image.

5. The passive human detection method according to claim 1, wherein the detection information of the human comprises one or a combination of more of whether there is a human, human position, height, human posture, or motion parameter information.

6. A passive human detection apparatus, comprising:
   a temperature detection module, configured to acquire an infrared radiation signal in an environment, and acquire a temperature of a target object;
   an electromagnetic wave detection module, configured to emit an electromagnetic wave into the environment, and acquire a reflected echo signal;
   a position detection module, configured to determine a position of the target object in the environment based on the reflected echo signal;
   a threshold matching module, configured to match a threshold range based on the position of the target object;
   a human detection module, configured to compare the temperature of the target object with the threshold range to determine detection information of a human in the environment; and
   a range determination module, configured to determine a distance between the target object and an infrared radiation signal detection source based on the reflected echo signal, and determine the threshold range through a temperature display range model based on the distance; and adjust temperature values of upper and lower limits by changing the threshold range based on the distance of the target object, wherein the threshold range matches a temperature display range of the human presented in a thermal image at the distance;
   wherein a temperature display range determination model is obtained through training based on temperatures displayed in the thermal image of a plurality of humans at different distances from a thermal imager, and the temperature display range determination model is configured to output the temperature display range of the human at a specific distance based on an input distance.

7. An electronic device, comprising a memory and a processor, wherein the memory is configured to store a computer program; and the computer program is executed by the processor to implement the passive human detection method according to claim 1.

8. A computer-readable storage medium, configured to store a computer program, wherein the computer program is executed by a processor to implement the passive human detection method according to claim 1.

9. The electronic device according to claim 7, wherein in the passive human detection method, the infrared radiation signal is acquired by the thermal imager, and is converted into the thermal image.

10. The electronic device according to claim 7, wherein in the passive human detection method, when the temperature of the target object is within the threshold range, a motion posture of the target object is determined through a posture recognition model based on a shape of the target object in the thermal image.

11. The electronic device according to claim 10, wherein in the passive human detection method, motion parameter information of the target object with the motion posture is determined based on the reflected echo signal and the thermal image.

12. The electronic device according to claim 7, wherein in the passive human detection method, the detection information of the human comprises one or a combination of more of whether there is a human, human position, height, human posture, or motion parameter information.

13. The computer-readable storage medium according to claim 8, wherein in the passive human detection method, the infrared radiation signal is acquired by the thermal imager, and is converted into the thermal image.

14. The computer-readable storage medium according to claim 8, wherein in the passive human detection method, when the temperature of the target object is within the threshold range, a motion posture of the target object is determined through a posture recognition model based on a shape of the target object in the thermal image.

15. The computer-readable storage medium according to claim 14, wherein in the passive human detection method, motion parameter information of the target object with the motion posture is determined based on the reflected echo signal and the thermal image.

16. The computer-readable storage medium according to claim 8, wherein in the passive human detection method, the detection information of the human comprises one or a combination of more of whether there is a human, human position, height, human posture, or motion parameter information.

\* \* \* \* \*